(12) United States Patent
Boyer et al.

(10) Patent No.: US 7,081,601 B2
(45) Date of Patent: Jul. 25, 2006

(54) VOLTAGE SELECTION MODE FOR A COOKING APPLIANCE

(75) Inventors: Mark A. Boyer, Harrison, TN (US); Robert Z. Whipple, Jr., Louden, TN (US)

(73) Assignee: Maytag Corporation, Newton, IA (US)

( * ) Notice: Subject to any disclaimer, the term of this patent is extended or adjusted under 35 U.S.C. 154(b) by 78 days.

(21) Appl. No.: 10/410,288

(22) Filed: Apr. 10, 2003

(65) Prior Publication Data

US 2004/0200826 A1 Oct. 14, 2004

(51) Int. Cl.
*H05B 3/02* (2006.01)

(52) U.S. Cl. .............. 219/482; 219/497; 219/412; 219/488; 219/492

(58) Field of Classification Search ............. 219/482, 219/497, 506, 481, 412, 413, 414, 488, 492; 392/396; 307/117
See application file for complete search history.

(56) References Cited

U.S. PATENT DOCUMENTS

| | | | | |
|---|---|---|---|---|
| 3,686,475 A | * | 8/1972 | Mikkola | 392/396 |
| 4,686,356 A | * | 8/1987 | Ueda et al. | 219/482 |
| 5,029,244 A | * | 7/1991 | Fowler | 219/497 |
| 5,212,360 A | | 5/1993 | Carlson | |
| 5,285,053 A | * | 2/1994 | Fowler | 219/506 |
| 5,369,561 A | * | 11/1994 | McCullough | 363/37 |
| 5,616,269 A | | 4/1997 | Fowler et al. | |
| 5,618,460 A | * | 4/1997 | Fowler et al. | 219/497 |
| 5,653,906 A | | 8/1997 | Fowler et al. | |
| 5,841,204 A | * | 11/1998 | English | 307/117 |
| 5,990,460 A | * | 11/1999 | Petty et al. | 219/497 |
| 6,232,582 B1 | * | 5/2001 | Minnear et al. | 219/497 |
| 6,355,914 B1 | * | 3/2002 | Stockley | 219/482 |
| 6,617,554 B1 | * | 9/2003 | Moon et al. | 219/481 |
| 2002/0117497 A1 | | 8/2002 | Bassill et al. | |

\* cited by examiner

*Primary Examiner*—John A. Jeffery
*Assistant Examiner*—L Fastovsky
(74) *Attorney, Agent, or Firm*—Diederiks & Whitelaw, PLC

(57) ABSTRACT

A cooking appliance includes an oven cavity, an electric heating element and a rapid cook heating system both of which being operable on either one of first and second supply voltages, and a controller including a memory module having stored therein first and second control algorithms. The controller will operate the cooking appliance based on one of the first or second control algorithm depending upon whether the cooking appliance is connected to the first or second supply voltages respectively. Preferably, the appliance includes a sensor for signaling the controller as to the presence of either the first or second supply voltage. In the alternative, the appliance can be manually set for use with a particular voltage supply.

24 Claims, 2 Drawing Sheets

VOLTAGE SELECTION MODE FOR A COOKING APPLIANCE

BACKGROUND OF THE INVENTION

1. Field of the Invention

The present invention pertains to the art of appliances and, more particularly, to a cooking appliance including an electronic control unit which establishes operational parameters of the appliance based, at least in part, on an available supply voltage.

2. Discussion of the Prior Art

A mains supply voltage can vary greatly from location to location. A typical household supply for an oven or range is 240 VAC (Volts Alternating Current), but can vary as much as ±20 VAC. Moreover, in many commercial locations, for example, department stores, multi-family dwellings and in several metropolitan areas, the mains supply voltage for an appliance is 208 VAC.

There is a noticeable difference in cooking results when using a 208 VAC supply voltage as compared to a 240 VAC supply voltage. Since the 208 VAC supply cannot deliver the same power to an electric heating element as the 240 VAC supply, an appliance that uses pre-programmed duty cycles and cycle times for operating the electric heating element will have different results when connected to a supply voltage other than the rated voltage for the appliance. However, these problems aside, the benefits of this type of pre-programmed operation cannot be ignored, particularly since pre-programmed cooking operations provide the consumer with a great deal of flexibility in performing various cooking operations.

The overall performance of an appliance including pre-programmed cooking operations is greatly enhanced over other standard appliances. Varying the duty cycle and cycle times of the electric heating element enables the appliance to efficiently maintain oven cavity temperatures while, at the same time, reduces the amount of energy consumed by the appliance. Moreover, by including pre-set operations, favorites and other such features, the consumer is able to fully exploit the many advantages of the modern cooking appliance. Therefore, customizing the duty cycles and cycle times for the electric heating element based on supply voltage will result in more efficient and consistent results when performing various cooking operations, such as broiling, baking and convection cooking. In this manner, the appliance becomes more desirable to consumers.

Based on the above, there exists a need in the art for a cooking appliance that includes a control that can provide customized performance for each supply voltage. More specifically, there exists a need for an appliance control that can operate the appliance according to a first control algorithm when a first supply voltage is available and according to a second control algorithm when a different supply voltage is present.

SUMMARY OF THE INVENTION

The present invention is directed to a cooking appliance including an oven cavity, an electric heating system having at least one electric heating element operable on first and second supply voltages, and a controller. More specifically, the controller includes a memory module having stored therein first and second control algorithms for operating the heating system. Preferably, the controller operates the heating system in accordance with the first control algorithm when the appliance is connected to the first supply voltage and in accordance with the second control algorithm when the appliance is connected to the second supply voltage.

In accordance with one preferred form of the present invention, a sensor is provided to sense the presence of the supply voltage. The sensor provides a signal to the controller identifying the supply voltage available to the appliance. Based, at least in part, upon the signal provided by the sensor, the controller automatically implements the first or second control algorithm to customize operation of the electric heating system in a manner corresponding to the available voltage supply.

In accordance with another preferred embodiment of the present invention, the appliance is provided with a display interconnected with a plurality of control elements and the controller. More specifically, the display provides a user with a set-up menu for establishing initial operating parameters of the cooking appliance. Through manipulation of the control elements, the user can toggle between various options and select the appropriate setting corresponding to the available supply voltage. Once the user selects the appropriate supply voltage, the controller implements the first or second control algorithm to customize operation of the heating system in a manner corresponding to the available voltage supply.

Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF THE PREFERRED EMBODIMENTS

Figure 1:
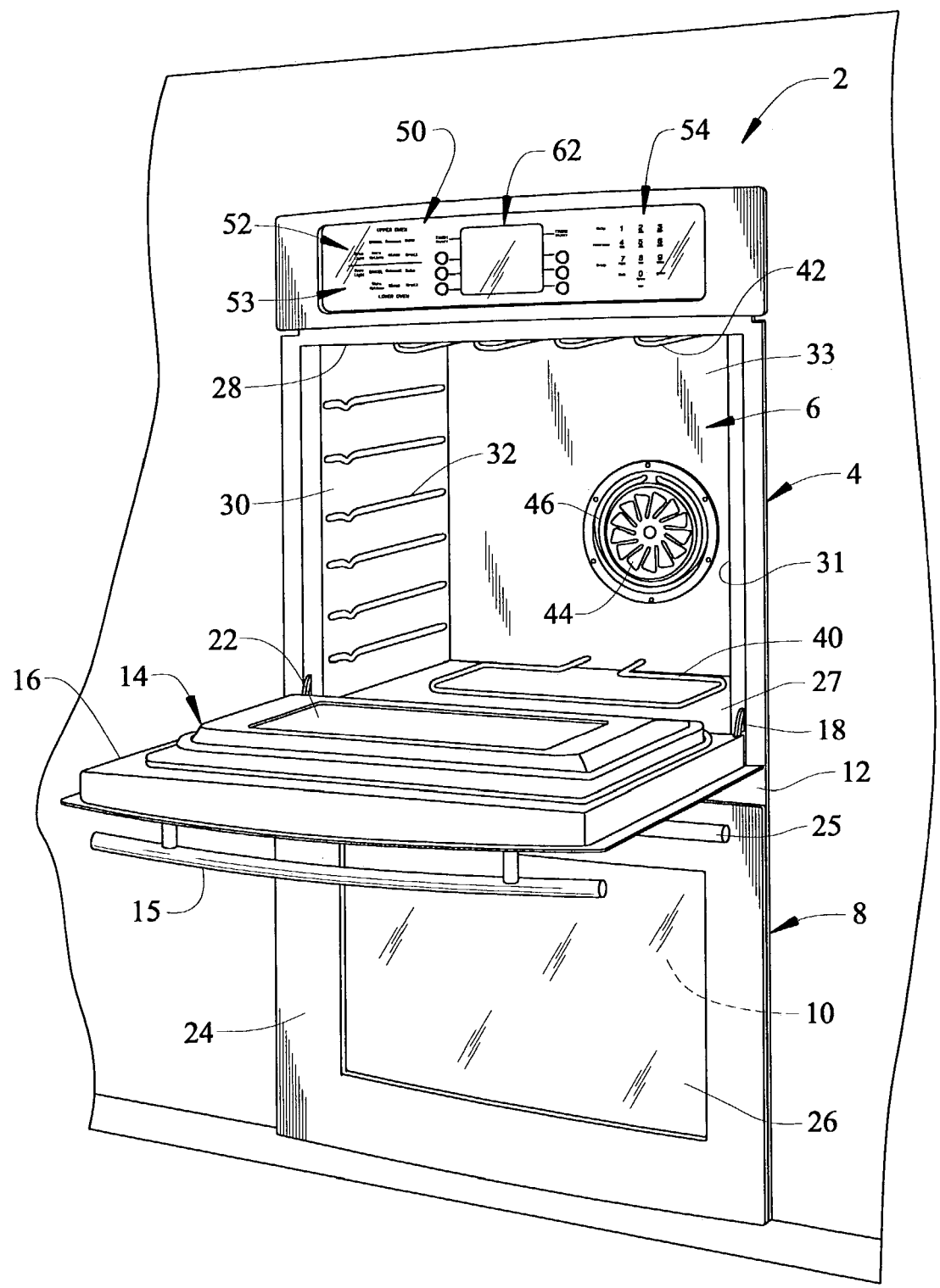
FIG. 1 is a perspective view of a wall oven constructed in accordance with the present invention.

With initial reference to FIG. 1, a cooking appliance constructed in accordance with the present invention is generally indicated at 2. Cooking appliance 2, as depicted, constitutes a double wall oven. However, it should be understood that the present invention not limited to this model type and can be incorporated into various types of oven configurations, e.g., cabinet mounted ovens, as well as both slide-in and free standing ranges. In any event, in the embodiment shown, cooking appliance 2 constitutes a dual oven wall unit including an upper oven 4 having upper oven cavity 6 and a lower oven 8 having a lower oven cavity 10. Cooking appliance 2 includes an outer frame 12 for supporting both upper and lower oven cavities 6 and 10.

In a manner known in the art, a door assembly 14 is provided to selectively provide access to upper oven cavity 6. As shown, door assembly 14 includes a handle 15 at an upper portion 16 thereof. Door assembly 14 is adapted to pivot at a lower portion 18 to enable selective access to within oven cavity 6. In a manner also known in the art, door 14 is provided with a transparent zone or window 22 for viewing the contents of oven cavity 6 while door 14 is closed. A corresponding door assembly 24 including a handle 25 and a transparent zone or window 26 is provided to selectively access lower oven cavity 10.

As best seen in FIG. 1, oven cavity 6 is defined by a bottom wall 27, an upper wall 28, opposing side walls 30 and 31 provided with a plurality of vertically spaced side rails 32, and a rear wall 33. In the preferred embodiment shown, bottom wall 27 is constituted by a flat, smooth surface designed to improve the cleanability of oven cavity 6. Arranged about bottom wall 27 of oven cavity 6 is a bake element 40. Also, a top broiler element 42 is arranged along upper wall 28 of oven cavity 6. Top broiler element 42 is provided to enable a consumer to perform a grilling process in upper oven 4 and to aid in pyrolytic heating during a self-clean operation. More specifically, both bake element 40 and top broiler element 42 are constituted by sheathed electric resistive heating elements.

Based on the above, in the preferred embodiment depicted, cooking appliance 2 actually constitutes an electric, dual wall oven. However, it is to be understood that cooking appliance 2 could equally operate on gas, either natural or propane. In any case, both oven cavities 6 and 10 preferably employ both radiant and convection heating techniques for cooking food items therein. To this end, rear wall 33 is shown to include a convection fan or blower 44. Although the exact position and construction of fan 44 can readily vary in accordance with the invention, in accordance with the most preferred form of the invention, fan 44 draws in air at a central intake zone (not separately labeled) and directs the air into oven cavity 6 in a radial outward direction. Also as clearly shown in this figure, another sheathed electric heating element 46, which preferably takes the general form of a ring, extends circumferentially about fan 44 in order to heat the radially expelled air flow. At this point, it should be noted that a fan cover, which has not been shown for the sake of clarity of the drawings, extends about fan 44 and heating element 46, preferably with the cover having an associated central inlet and a plurality of outer radial outlet openings.

Figure 2:
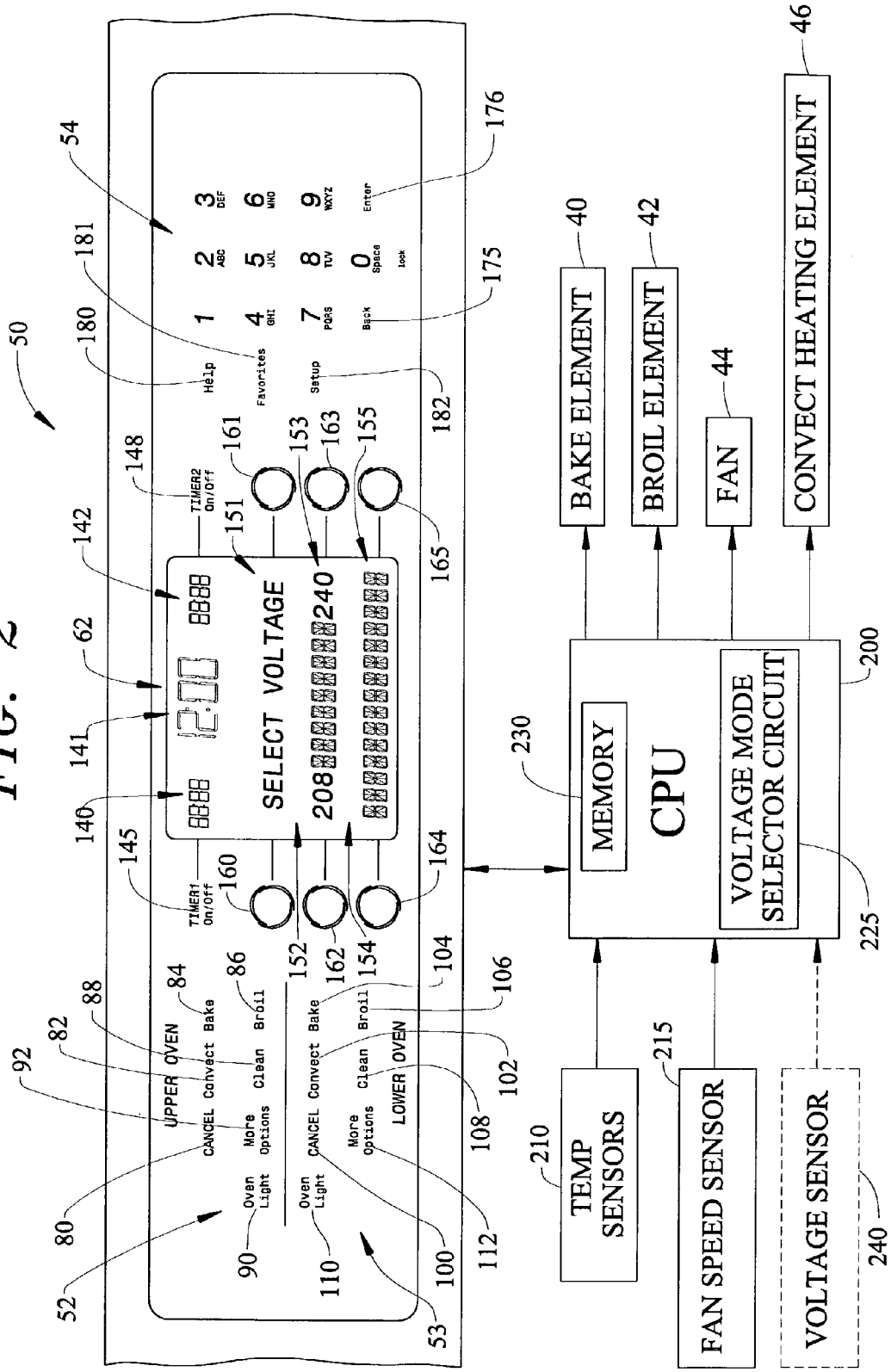
FIG. 2 is an enlarged view of a control panel employed in connection with the wall oven of FIG. 1.

As further shown in FIGS. 1 and 2, cooking appliance 2 includes an upper control panel 50 having a plurality of control elements. In accordance with one embodiment, the control elements are constituted by first and second sets of oven control buttons 52 and 53, as well as a numeric pad 54. Control panel 50 is adapted to be used to input desired cooking parameters and, as will be discussed more fully below, input initial operating conditions for cooking appliance 2. More specifically, the first and second sets of control buttons 52 and 53, in combination with numeric pad 54 and a display 62, enable a user to establish particular cooking operations for upper and lower ovens 4 and 8 respectively.

In the preferred embodiment particularly shown in FIG. 2, first set of control buttons 52 includes a cancel button 80, a convection button 82, a bake button 84, a broil button 86, and a clean button 88. In addition, first set of control buttons 52 also preferably includes an oven light button 90 and a button 92 used to access more cooking options which are conveyed to the user through display 62. In a corresponding manner, second set of control buttons 52 includes a cancel button 100, a convection button 102, a bake button 104, a broil button 106, and a clean button 108. Furthermore, second set of control buttons 53 also preferably includes an oven light button 110 and a button 112 which is used to access more cooking options that are conveyed to the user through display 62.

To this end, display 62 is preferably divided into various sections. In accordance with the most preferred embodiment of the invention, an uppermost section of display 62 is sub-divided into three time display zones 140-142. More specifically, leftmost display zone 140 constitutes a first timer zone having an associated timer button 145. Central display zone 141 constitutes a clock for cooking appliance 2. Rightmost display zone 142 constitutes a second timer zone having an associated timer button 148.

Spaced below time display zones 140–142 are a series of vertically spaced information display zones 151–155. Each of information display zones 151, 153 and 155 has associated left and right portions (not separately labeled). As shown, each of the left and right portions have associated therewith laterally positioned selection buttons 160–165. As also shown, numeric pad 54 preferably enables alpha-numeric input. That is, in addition to presenting numbers 0–9, numeric pad 54 doubles as an input source for alpha information. To this end, in a manner somewhat analogous to a telephone keypad, the number 2 button functions for ABC letter entry; the number 3 button functions for DEF letter entry; the number 4 button functions for GHI letter entry; the number 5 button functions for JKL letter entry; the number 6 button functions for MNO letter entry; the number 7 button functions for PQRS letter entry; the number 8 button functions for TUV letter entry; and the number 9 button functions for WXYZ letter entry. The number 0 button can also be used to input a space. On either side of the number 0 button are Back and Enter buttons 175 and 176 which can be used in combination with the various alpha keys for information entry. Finally, provided adjacent numeric pad 54 are Help, Favorites and Setup buttons 180–182.

In general, control panel 50 is linked to a controller or CPU 200 formed as part of cooking appliance 2. Therefore, CPU 200 receives user inputs and selections through control panel 50, as well as signals from sensors associated with cooking appliance 2, i.e. oven temperature sensors for upper and lower ovens 4 and 8 as generally indicated at 210 and a fan speed sensor 215. In turn, CPU 200 controls bake element 40, top broiler element 42, convection fan 44 and convection heating element 46.

Since various programming and general operation characteristics of cooking appliance 2 do not form part of the present invention, these features will not be discussed further here. Instead, the present invention is particularly directed to the operation of cooking appliance 2 based on the incorporation of a voltage selector circuit 225 and a memory module 230 in CPU 200. More specifically, memory module 230 has stored therein first and second control algorithms for establishing particular operational parameters for cooking appliance 2 based on a connection to an available supply voltage.

In accordance with one aspect of the present invention, cooking appliance 2 operates according to the first control algorithm when connected to a first supply voltage, e.g., 208 VAC and in accordance with the second control algorithm when the appliance is connected to a second voltage supply, e.g., 240 VAC. With this arrangement, operational parameters of a particular cooking process, i.e., a particular duty cycle for activation of bake element 40, convection fan 44 and/or convection heating element 46, as well as particular cycle times for each of the aforementioned components, is controlled in a most efficient manner. That is, as each of the first and second supply voltages provides different amounts of power, controller 200 operates the electrical loads in a manner that makes the most efficient use of available power. In general, the number and duration of duty cycles will depend on the level of voltage supplied to cooking appliance 2. For instance, the higher the voltage level, the number and duration of duty cycles, will decrease. Of course the exact number and duration of each duty cycle will depend on the particular power requirements of the electrical load.

In accordance with one form of the invention, a consumer can relay to voltage mode selector circuit 225 the particular supply voltage for cooking appliance 2. As discussed above, control panel 50 enables the consumer to input various initial operating parameters into CPU 200. Toward that end, the consumer can enter a set-up menu by operating button 182 such that various options are presented on display 62. More specifically, one of the available options will enable the consumer to directly input the particular one of the first and second supply voltages as determined by the particular connection to the appliance by pressing a corresponding selection button 162, 163 as shown in FIG. 2. After having input the supply voltage through the set-up menu, voltage mode selector circuit 225 establishes the first or second control algorithm in CPU 200 for operating appliance 2.

In accordance with another preferred embodiment of the present invention, voltage mode selector circuit 225 automatically receives an input from a voltage sensor 240 signaling the presence of either the first or second supply voltage. With this arrangement, upon initial connection and start-up of cooking appliance 2, voltage sensor 240 detects the presence of the available supply voltage and signals voltage mode selector circuit 225 of the existence of either the first or second supply voltage such that CPU 200 automatically operates according to the corresponding first or second control algorithms. Toward that end, when a user establishes a particular cooking operation through first and/ or second sets of control elements 52, 53, keypad 54 and/or favorite button 181, cooking appliance 2 will optimize the duty cycles and cycle times of bake element 40, broil element 42, convection fan 44 and convection heating element 46 so as to take advantage of the particular power levels provided by the relevant supply voltages.

Therefore, in accordance with the invention, cooking appliance 2 can be manually or automatically set to operate in accordance with one of multiple, predetermined algorithms based on an available voltage supply. This function is considered to be extremely advantageous when employed in connection with an appliance incorporating both conventional and rapid cooking systems having a plurality of power consumption components. In any event, although described with reference to preferred embodiments of the invention, it should be readily understood that various changes and/or modifications can be made to the invention without departing from the spirit thereof. For instance, while the cooking appliance is shown to include electric heating elements and a convection fan system, a microwave heating system could be added to the appliance without departing from the scope of the invention. In addition, while voltage selection is described as being performed through control inputs on the control panel or through a voltage sensor, various other provisions could be made for selecting the voltage, such as providing a dedicated switch at a power connection point, jumper wires in the control panel or cut wires contained in a bus circuit arranged within the control panel. Finally, while the voltages corresponding to the first and second control algorithms are described as being 208 VAC and 240 VAC, it should be understood that the present invention is equally applicable to any and all voltages used to power cooking appliances. In general, the invention is only intended to be limited by the scope of the following claims.

We claim:

1. A cooking appliance comprising:
   an oven cavity including top, bottom, rear and opposing side walls;
   an electric heating element for heating the oven cavity during at least a portion of a cooking process, said electric heating element being operable on at least first and second supply voltages;
   a rapid cook heating source; and
   a controller including a memory module having stored therein first and second control algorithms, wherein the controller operates at least one of the electric heating element and rapid cook heating source in accordance with the first control algorithm when the appliance is connected to the first supply voltage and in accordance with the second control algorithm when the appliance is connected to the second supply voltage, with said first and second control algorithms establishing differing duty cycles and cycle times for the at least one of the electric heating element and rapid cook heating source in dependence upon an available supply voltage.

2. The cooking appliance according to claim 1, wherein the rapid cook heating source includes a convection fan and a convection heat element.

3. The cooking appliance according to claim 1, further comprising: a display unit, said display unit being adapted to present a set-up menu for permitting a user to establish initial settings for the appliance, wherein the set-up menu enables manually selecting between the first and second supply voltages.

4. The cooking appliance according to claim 3, wherein the set-up menu prompts a user to select between the first and second supply voltages.

5. The cooking appliance according to claim 1, wherein the controller varies a duty cycle of both of the electric heating element and the rapid cook heating source to maintain a desired temperature within the oven cavity based on an established one of the first and second control algorithms.

6. The cooking appliance according to claim 5, wherein the controller varies a cycle time for both of the electric heating element and the rapid cook heating source to maintain a desired temperature within the oven cavity based on the established one of the first and second control algorithms.

7. The cooking appliance according to claim 1, further comprising: a sensor for detecting a supply voltage, said sensor signaling the controller as to the presence of one of the first and second supply voltages.

8. The cooking appliance according to claim 7, wherein the controller automatically operates the appliance in accordance with one of the first and second control algorithms based on the detected supply voltage.

9. The cooking appliance according to claim 1, wherein the first supply voltage is 208 Volts and the second supply voltage is 240 Volts.

10. A cooking appliance comprising:
    an oven cavity;
    a radiant heating element arranged for producing radiant heat in the oven cavity;
    a rapid cook heating source;
    a control panel for inputting control parameters for a desired cooking operation;
    voltage selector means for establishing a permissible operating mode base on an input voltage available to the cooking appliance; and
    means for controlling the radiant heat element and the rapid cook heating source, said controlling means functioning to alter at least one of a duty cycle and a cycle time of at least one of the radiant heating element and the rapid cook heating source in dependence on the permissible operating mode, such that the number and duration of duty cycles will be altered based on the input voltage.

11. The cooking appliance according to claim 10, wherein the rapid cook heating source includes a convention fan and a convection heating element.

12. The cooking appliance according to claim 10, further comprising: a display unit, said display unit being adapted to present a set-up menu for permitting a user to establish initial settings for the appliance, wherein the set-up menu enables manually selecting between the first and second supply voltages.

13. The cooking appliance according to claim 12, wherein the set-up menu prompts a user to select between the first and second supply voltages.

14. The cooking appliance according to claim 10, wherein the controller varies a duty cycle of both of the electric heating element and the rapid cook heating source to maintain a desired temperature within the oven cavity based on an established one of the first and second control algorithms.

15. The cooking appliance according to claim 14, wherein the controller varies a cycle time for both of the electric heating element and the rapid cook heating source to maintain a desired temperature within the oven cavity based on the established one of the first and second control algorithms.

16. The cooking appliance according to claim 10, further comprising: a sensor for detecting a supply voltage, said sensor signaling the controller as to the presence of one of the first and second supply voltages.

17. The cooking appliance according to claim 16, wherein the controller automatically operates the appliance in accordance with one of the first and second control algorithms based on the detected supply voltage.

18. The cooking appliance according to claim 10, wherein the first supply voltage is 208 Volts and the second supply voltage is 240 Volts.

19. A method of operating a cooking appliance including an oven cavity, an electric heating element and a rapid cook heating system which are operable on either one of first and second supply voltages for heating the oven cavity, and a controller having a memory comprising:

connecting the cooking appliance to one of the first or second supply voltages;

inputting to the controller which of the first and second supply voltages the appliance is connected; and operating at least one of the electric heating element and the rapid cook heating source in accordance with a first control algorithm stored in the memory when the cooking appliance is connected to the first supply voltage and in accordance with a second control algorithm stored in the memory when the cooking appliance is connected to the second supply voltage, with said first and second control algorithms establishing differing duty cycles and cycle times for the at least one of the electric heating element and rapid cook heating source in dependence upon an available supply voltage.

20. The method according to claim 19, further comprising:

sensing a presence of the first or second supply voltage through a sensor interconnected with the controller; and automatically operating the electric heating element in accordance with either the first or second control algorithm based on the sensed supply voltage.

21. The method according to claim 19, further comprising:

displaying a set-up menu on a display screen for selecting operational parameters for the cooking appliance;

selecting between the first and second supply voltage based on a mains supply connected to the appliance; and operating the at least one of the electric heating element and the rapid heating source based on the selected one of the first and second supply voltages.

22. The method of claim 19, further comprising: varying the duty cycles of each of the electric heating element and the rapid cook heating source to maintain a substantially uniform temperature within the oven cavity.

23. The method of claim 22, further comprising: varying the cycle time of both of the electric heat element and the rapid cook heating source to maintain the substantially uniform temperature within the oven cavity.

24. The method of claim 19, wherein operating the rapid cook heating source is defined by operating a convention fan and a convection heating element.

* * * * *